United States Patent [19]

Castellani

[11] Patent Number: 5,013,212
[45] Date of Patent: May 7, 1991

[54] APPARATUS FOR PACKING PROFILES WITH THE ASSISTANCE OF AN ELECTROMAGNETIC TRANSFER HANGING MECHANISM

[75] Inventor: Frederico Castellani, Treppo Grande, Italy

[73] Assignee: S.I.M.A.C. S.p.A., Tarcento, Italy

[21] Appl. No.: 446,484

[22] Filed: Dec. 5, 1989

[30] Foreign Application Priority Data

Jan. 4, 1989 [IT] Italy ................ 83302 A/89

[51] Int. Cl.⁵ ............... B65G 57/04; B65G 57/18
[52] U.S. Cl. ................ 414/791.4; 414/788.2
[58] Field of Search ......... 414/788.3, 788.9, 791.3, 414/791.4, 791.6, 793.2, 924, 788.2; 198/468.5, 468.2

[56] References Cited

U.S. PATENT DOCUMENTS

| | | | |
|---|---|---|---|
| 3,880,273 | 4/1975 | Kaplan | 198/468.5 |
| 4,184,800 | 1/1980 | Uchida et al. | 414/791.4 X |
| 4,487,540 | 12/1984 | Buchheit | 414/791.4 X |
| 4,566,833 | 1/1986 | Gigante | 414/791.4 X |

FOREIGN PATENT DOCUMENTS

| | | | |
|---|---|---|---|
| 0196585 | 8/1986 | European Pat. Off. | |
| 1235811 | 3/1967 | Fed. Rep. of Germany | 414/791.4 |
| 2124221 | 9/1972 | France | |
| 135035 | 8/1983 | Japan | 414/791.4 |
| 27231 | 2/1987 | Japan | 414/791.3 |
| 2092091 | 8/1982 | United Kingdom | 414/791.4 |

Primary Examiner—Frank E. Werner
Assistant Examiner—Brian K. Dinicola
Attorney, Agent, or Firm—Curtis, Morris & Safford

[57] ABSTRACT

An apparatus for moving rods to a packaging area and packing rods thereat which includes a conveyor for advancing movement of the rods between retractable stop members which are capable of separating the rods into rod layers. An upsetting mechanism is provided along the conveyor such that normal packing of selected layers of the rod layers can be disrupted to accommodate rods of varying shapes and sizes and the selected rod can fall subsequently downwardly into the packaging area. An electromagnetic transfer hanging mechanism is also provided for transferring the rod layers into the upsetting mechanism or depositing the same into the packaging area. The electromagnetic transfer hanging mechanism has at least two rows of electrtomagnets capable of vertically and horizontally moving the rod layers.

9 Claims, 1 Drawing Sheet

APPARATUS FOR PACKING PROFILES WITH THE ASSISTANCE OF AN ELECTROMAGNETIC TRANSFER HANGING MECHANISM

BACKGROUND OF THE INVENTION

The present invention relates to a method and apparatus for packing rod profiles with the assistance of an electromagnetic transfer hanging mechanism, and more particularly, the present invention relates to a method and apparatus for packing rod profiles which permit the packing of the rod layers to be upset to accommodate rods of varying shapes and sizes, and even of alternative layers of (N) and (N−1) rods as for example with rods having a generally "L" section shape.

The same applicant in Italian patent Application No. 83488A/88 has previously disclosed a packing plant having an electromagnetic transfer hanging mechanism.

In this previous apparatus substantially two rows of an electromagnet transfer hanging mechanism are utilized to transfer two rods layers such as (N) and (N−1) to a zone of packing.

This apparatus, however, does not allow for upset of rod layers, i.e. that packing of a predesignated rod layer can be temporarily suspended such that rods may be packed of varying shapes and sizes.

OBJECTS OF THE INVENTION

A general object of the present invention is to provide an apparatus and method for packing profiles which avoids the aforementioned deficiencies of the prior art.

Another object of the present invention is to provide an apparatus and method for packing profiles which not only includes an electromagnetic transfer hanging mechanism, but also includes a mechanism for upsetting normal packing of the rod layers to accommodate packing rods of varying sizes and shapes.

Various other objects, advantages and features of the present invention will become readily apparent from the ensuing detailed description, and the novel features will be particularly pointed out in the appended claims.

SUMMARY OF THE INVENTION

In accordance with the present invention, a method and apparatus for moving rods to a packaging area and packaging rods thereat includes a conveyor for advancing movement of the rods between retractable stop members which are capable of separating the rods into rod layers, such as (N, N−1, . . . ); and an upsetting mechanism is provided along the conveyor such that movement of selected layers of the rod layers can be upset along the conveyor such that normal packing of the rods can be disrupted to accommodate packing rods of varying shapes and sizes and the rods can thus fall subsequently downwardly into the packaging area.

An electromagnetic transfer hanging mechanism is also provided for transferring the rod layers into the upsetting mechanism or depositing the same into the packaging area. The electromagnetic transfer hanging mechanism includes two rows of electromagnets capable of vertically and horizontally moving the rod layers. In such way it is possible to reach the prefixed scope with an extremely fast, efficient and rational apparatus which allows rods to be packed of any shape or size, by means of simple overlapping with the same number of rods, by upsetting the layers or size and even by overlapping of rod layers with a non-uniform number of rods.

BRIEF DESCRIPTION OF THE DRAWINGS

The following detailed description, given by way of example, will best be understood in connection with accompanying drawings in which.

DETAILED DESCRIPTION OF A PREFERRED EMBODIMENT

Figure 1:
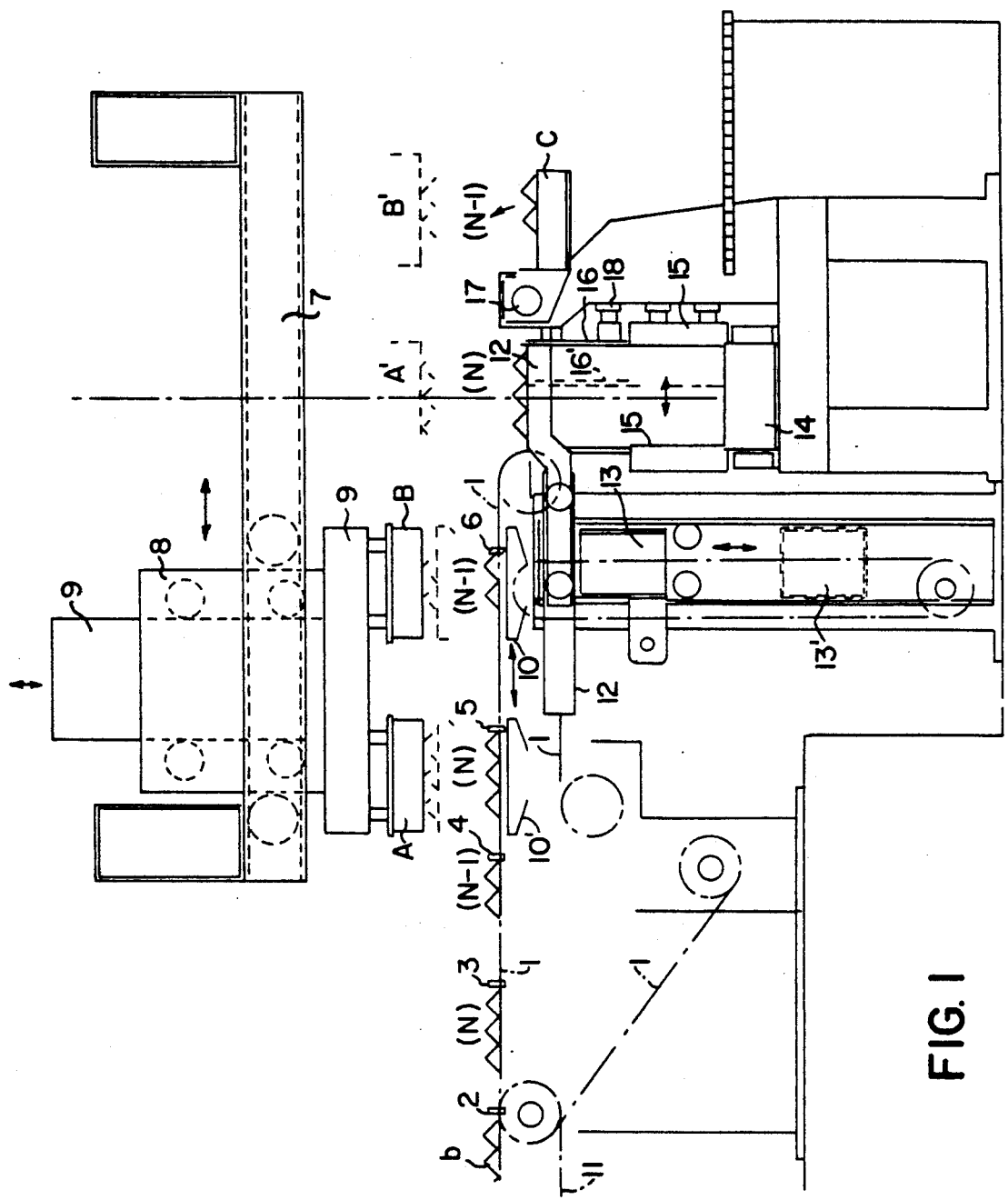
FIG. 1 represents a schematic view of a preferred embodiment of the apparatus for packing profiles in accordance with the invention.

Referring now to the FIGURE:

First advancing means (11) associated with a retractable first stop member (2) for accumulating advancing rods in advancement in said first advancing means (11).

A second transverse advancing rod member (1, b) with endless belt or chain for supporting the advancing rods. The second transverse advancing rod member includes:

a second retractable stop member (3) for the formation of layers of (N) rods;

a third retractable stop member (4) for the formation of (N−1) layers of rods, or vice-versa;

a fourth retractable stop member (5, 6) associated with a movable support member (10) for supporting a central portion of the formed layer, the support member being capable of moving the second transverse advancing member (1);

a rod layer holding member having a vertically movable support stand (12) such that the stand can be lowered for the formation of the package;

a rod layer upsetting mechanism (17 - C) for upsetting movement of selected layers of the rod layers being provided along the second transverse advancing mechanism such that the selected layer can be transferred and fall downwardly into the packaging area;

an electromagnetic transfer hanging mechanism with at least two rows of electromagnet hanging members (A, B) vertically and horizontally movable for lowering and hoisting (9, 13–13') the rod layers (N) and/or (N−1), and transferring the rod layers in the packaging area or to the upsetting mechanism (C).

As shown in FIG. 1, the displacement of the rows of electromagnet transfer hanging members is actuated with an aerial set system guide member (7) which supports a bridgecrane (8) which can move vertically the entire magnet means structure (9) including the at least two rows of electromagnet hanging members (A-B).

As much advantageously the packing system includes two series of vertically opposed rollers (15) which co-operates with a series of lower rollers (14), which can be in the form of an endless belt conveyor (the latter can be an endless belt conveyor).

An entire side of the packing system, (preferably in the downstream side 16) having the respective vertically opposed rollers (15), is movable in toward and removal (16') respect to the opposed rollers, by means of a plurality of hydraulic cylinders (18). This movement of the packing system permits desired variations in the size of the forming package. A third series of electromagnets (C) is mounted downwardly on revolving arm (17) and is capable of receiving one of the rod layers (N−1) from the electromagnetic hanging member (B) vertically displaceable over it (B') while the other series of electromagnets is displaceable over the packaging area (A'). The packing apparatus of this invention can thus operate with layers of N and N−1 rods with layers N and N rods.

The two raisers (10 and 10') are positioned under the electromagnets (A, B) to lift the two layers (N) and (N−1) simultaneously towards the magnets A and B which include "combs" or templates for ensuring that the profiles (bars) assume the correct positions.

In order to operate the system such that one of the layers with (N) and (N−1) rods is respectively upset. The bridgecrane (8) which supports the magnets A and B, after lifting (9) is displaced laterally along the running track (7) such that:

the electromagnet (A) is positioned vertically over the package system and;

the electromagnet (B) is positioned over the electromagnets of revolving device (C) of the upsetting mechanism.

Simultaneously therewith the electromagnets A and B are lowered by the beam guide member (9) by any known appropriate command such that:

the layer (N) is filled in the package system.

the layer (N−1), or other rod layer, are filled on the rotating arm of electromagnets (C). The electromagnets (A, B) are then relifted and moved into their starting position, over the two raisers (10'-10).

When the bridgecrane is moved beyond the area of rotation of the rotating arm having the electromagnets (C) the rotating arm (17) will rotate 180° and stop over the packaging area such that the rod layer N−1 rod layer supported by rotating arms (17) will subsequently fall downwardly into the packaging area. The electromagnets (C) then return to their starting position such that it is capable of receiving another rod layer from the electromagnet (B). It is thus possible that any combination in the package, not withstanding whether the rod layers are of different number or are in an overlapping position or different size or shape, etc.

While the invention has been particularly shown and described with reference to a preferred embodiment, it will be readily appreciated by those of ordinary skill in the art that various changes and modifications may be made therein without departing from the spirit and scope of the invention. It is intended that the appended claims be interpreted as including the foregoing as well as various other such changes and modifications.

I claim:

1. An apparatus for moving rods to a packaging area and packing the rods thereat comprising:

conveying means for advancing movement of the rods between retractable stop means which are capable of separating the rods into rod layers (N, N−1, ...);

upsetting means for upsetting movement of selected layers of said rod layers along said conveying means such that said selected layers can fall downwardly into the packaging area;

electromagnetic transfer hanging means for transferring said rod layers into said upsetting means or depositing the same in the packaging area, said electromagnetic transfer hanging means having at least two rows of electromagnets capable of vertical rectilinear and horizontal rectilinear movement of said rod layers above said upsetting means and the packaging area.

2. The apparatus for moving rods to a packaging area and packing rods thereat of claim 1, wherein said rod layers are formed with (N) and (N−1) rods.

3. The apparatus for moving rods to a packaging area and packing rods thereat of claim 1, wherein;
said rod layers are formed with (N) and (N−1) rods; and
said layer of (N−1) rods is deposited in said upsetting means.

4. The apparatus for moving rods to a packaging area and packing rods thereat of claim 1, wherein said upsetting means includes electromagnetic lifting and deposition means for moving said selected layers of said rod layers.

5. The apparatus for moving rods to a packaging area and packing rods thereat of claim 1, wherein said upsetting means is positioned adjacent to the packaging area.

6. The apparatus for moving rods to a packaging area and packing rods thereat of claim 1, wherein said upsetting means are mounted adjacent to and downwardly of the packaging area.

7. The apparatus for moving rods to a packaging area and packing rods thereat of claim 1, wherein:

at least one of said at least two rows of said electromagnetic transfer hanging means is vertically displaceable downwardly into the packaging area; and at least one of said at least two rows of the said electromagnetic transfer hanging means is displaceable from above said upsetting means.

8. The apparatus for moving rods to a packaging area and packing rods thereat of claim 1, wherein:

the first row of said at least two rows of said electromagnetic transfer hanging means is displaceable downwardly into the packaging area; and the second row of said at least two rows of the said electromagnetic transfer hanging means is displaceable from above said upsetting means.

9. The apparatus for moving rods to a packaging area and packing rods thereat of claim 1, and further including:

first advancing means associated with first retractable stop means for accumulating advancing rods;

second transverse advancing means for moving said advancing rods said second transverse advancing having endless belt means for supporting the advancing rods and further including:

second retractable stop means for the formation of layers of (N) rods;

third retractable stop means for the formation of (N−1) layers of rods;

fourth retractable stop means associated with movable support means for determining a central position of the formed layer, said support means being capable of moving said second transverse advancing means in a vertical plane;

rod layer holding means with a vertically movable support stand lowerable to the packaging area for package forming;

upsetting means for upsetting movement of selected layers of said rod layers along said second transverse advancing means such that movement of said selected layer can be disrupted and said selected layers can subsequently fall downwardly into the packaging area; and electromagnetic transfer hanging means with at least two rows of electromagnet hanging members vertically movable for lifting said rod layers and horizontally displaceable for transferring the rod layers into said packaging area or into said upsetting means and wherein the displacement of the rows of said electromagnets hanging members is actuated by an aerial guide means which supports a bridgecrane which can move vertically said rows of said electromagnet hanging members of said electromagnet transfer hanging means.

* * * * *